United States Patent [19]

Willis et al.

[11] Patent Number: 5,559,794

[45] Date of Patent: Sep. 24, 1996

[54] TELECOMMUNICATION SYSTEM WITH SELECTIVE REMOTE INTERFACE ASSEMBLY AND METHOD

[75] Inventors: Lawrence A. Willis, McHenry; Daniel A. Mershon, Chicago; Boris Dubinsky, Buffalo Grove, all of Ill.

[73] Assignee: Rockwell International Corporation, Seal Beach, Calif.

[21] Appl. No.: 118,866

[22] Filed: Sep. 9, 1993

[51] Int. Cl.⁶ .................................................. H04Q 11/04
[52] U.S. Cl. ........................................ 370/58.3; 375/222
[58] Field of Search ..................... 370/13, 14, 58.1–58.3, 370/60, 60.1, 62, 16; 379/222, 210, 157, 211, 212, 214; 395/181, 182.01, 182.02; 375/222

[56] References Cited

U.S. PATENT DOCUMENTS

| | | | |
|---|---|---|---|
| 5,347,512 | 9/1994 | Fechalos et al. | 370/229 |
| 5,353,343 | 10/1994 | Hymel | 379/201 |
| 5,365,581 | 11/1994 | Baker et al. | 379/196 |
| 5,384,841 | 1/1995 | Adams et al. | 379/266 |
| 5,386,412 | 1/1995 | Park et al. | 370/53 |
| 5,392,329 | 2/1995 | Adams et al. | 379/49 |
| 5,400,327 | 3/1995 | Dezonno | 379/210 |
| 5,452,348 | 9/1995 | Adams et al. | 379/202 |

*Primary Examiner*—Douglas W. Olms
*Assistant Examiner*—Ajit Patel
*Attorney, Agent, or Firm*—C. B. Patti; G. A. Montanye

[57] ABSTRACT

A telecommunication system (10) with a distributed processor architecture having a central control processor (14) and a plurality of subprocessor controlled peripheral circuits (13) through which the central control processor (14) receives information and affects the central control of the telecommunication system (10), a selective remote interface assembly (11) which determines the operating state of the telecommunication system (10) and is connected with a single connection modem (30) and in which the selective remote interface assembly (11) selectively obtains a relatively full featured user through the single connection modem (30) when it is determined that the telecommunication system (10) is in an on-line state and to obtain a relatively limited user interface through the single connection modem (30) when it is determined that the telecommunication system (10) is in an off-line state.

23 Claims, 4 Drawing Sheets

TELECOMMUNICATION SYSTEM WITH SELECTIVE REMOTE INTERFACE ASSEMBLY AND METHOD

BACKGROUND OF THE INVENTION

1. Field of the Invention

The invention relates generally to the field of telecommunication systems, and more particularly, to such systems which communicate with a device at a remote location regardless of the operating state of the system.

2. Description of the Related Art Including Information Disclosed Under 37 C.F.R. Section 1.97–1.99

Telecommunications systems employing a multiplexing multiport switch controlled by a central controlling unit for selectively interconnecting telephonic calls from external telephonic units with internal telephonic units of the telecommunication system are well known. Examples of such telecommunications systems are shown in patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

It is also known to access information in such telecommunications systems from a remote computer based device regardless of the operating state of the system. If the multiport switch of the telecommunication system is in an on-line state, a full-featured user interface is available for communication with the remote device. Since the computer controlled remote device is actively connected to the telecommunication system in the on-line state, it is free to access a vast amount of information and perform numerous capabilities on the system through a series of commands. However, in these known systems, if the computer controlled multiport switch is in an off-line state, the remote device is not actively connected to the switch, and thus the remote device has only minimal user interface communication capabilities with the telecommunication system. For example, if the telecommunication system is in an off-line state, the remote computer device is limited to only those capabilities associated with running a diagnostic test or performing recovery actions on the system.

In these known telecommunications systems in order to access the system from a remotely located computer controlled device regardless of the operating state of the system, the use of a software controlled multiplexing modem is required. A sophisticated multiplexing modem, or multiconnection modem, is needed in these known systems to provide access to different parts of the switch during the different states of operation of the switch. Disadvantageously, these software controlled multiplexing modems are complex devices which are very costly to the purchaser of the telecommunication system as compared to single connection modems.

SUMMARY OF THE INVENTION

It is therefore the principal object of the present invention to provide a telecommunication system with a distributed processor architecture and method which selectively permits different user interfaces to the system are selectively permitted through a single connection modem depending upon different operating states of the system.

The object of the invention is achieved by providing, in a telecommunication system with a distributed processor architecture having a central control processor and a plurality of subprocessor controlled peripheral circuits through which the central control processor receives information and affects a central control of the system, a selective remote interface assembly comprising means for connecting with a single connection modem, means for determining the operating state of the telecommunication system and means responsive to the operating state determining means for selectively obtaining a relatively full featured user interface through the single connection modem connecting means when it is determined that the telecommunication system is in an on-line state and for obtaining a relatively limited user interface through the single connection connecting means when it is determined that the telecommunication system is in an off-line state.

The object of the invention is also achieved by provision, in a telecommunication system with a distributed processor architecture having a central control processor and a plurality of subprocessor controlled peripheral circuits through which the central control processor receives information and affects a central control of the system, a method of selectively interfacing with the telecommunication system comprising the steps of (a) determining the operating state of the telecommunication system and (b) selectively obtaining a relatively full featured user interface through the connected single connection modem when it is determined that the system is in an on-line state and selectively obtaining a relatively limited user interface through the single connection modem when it is determined that the system is in an off-line state.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
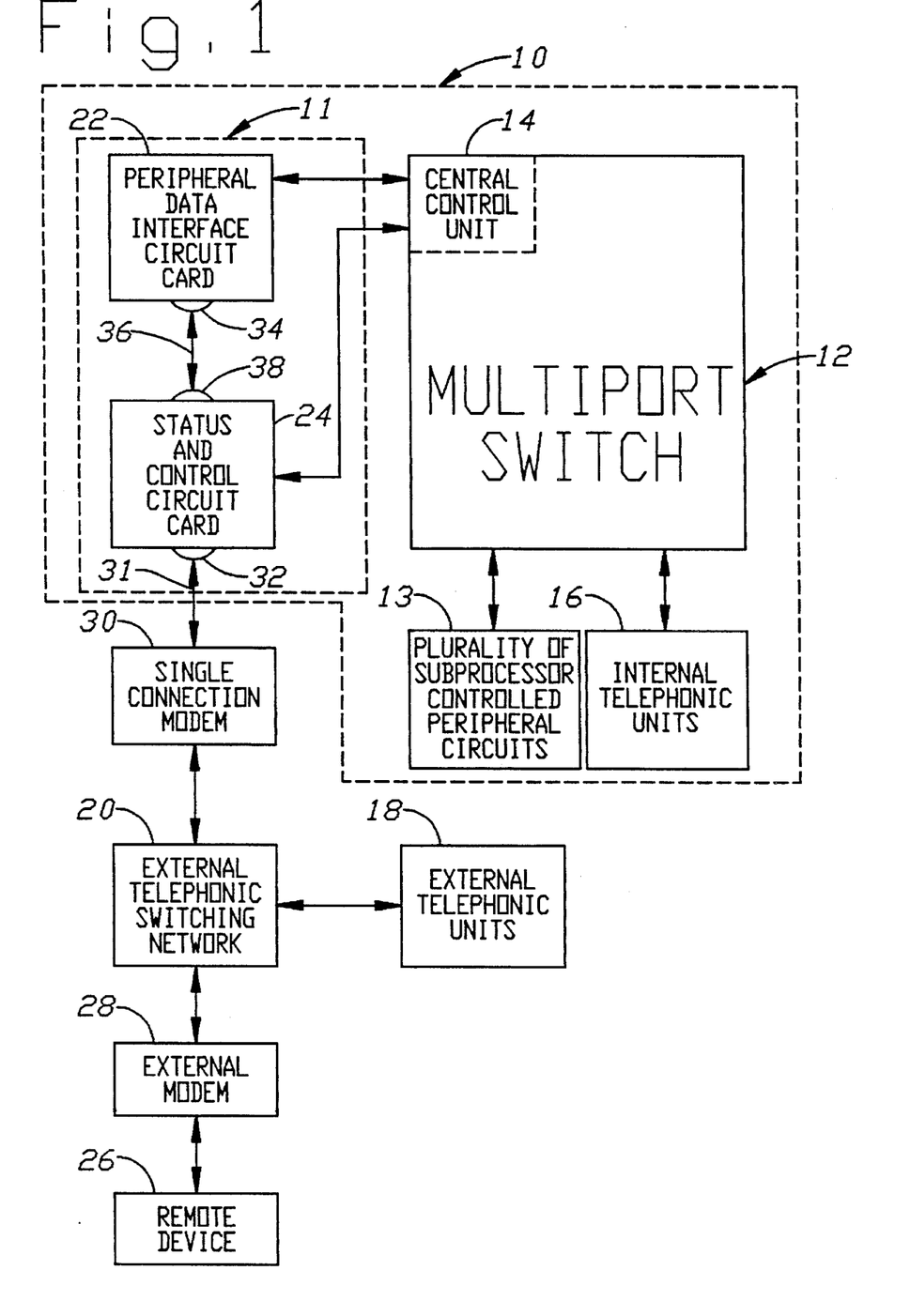
FIG. 1 is a functional block diagram of the preferred embodiment of the telecommunication system of the present invention.

Referring to FIG. 1 the telecommunication system 10 is shown having a multiport switch 12 controlled by a central control processor unit 14 for interconnecting internal telephonic units 16 with telephonic calls received from external telephonic units 18 through the external telephonic switching network 20. The telecommunications system 10 has a distributed processor architecture with many subprocessor controlled peripheral circuits 13 performing specialized functions and transmitting information to the central control processor 14 of the multiport switch 12. The selective remote interface assembly 11 of the present invention includes the subprocessor controlled peripheral circuits: the status and control circuit card 24 and the peripheral data interface circuit card 22. In the preferred embodiment, the status and control (STC) card 24 is one subprocessor controlled peripheral control circuit coupled to the central control processor 14 which contains the interfaces between the multiport switch and a remote maintenance device 26. The peripheral data interface (PDI) circuit card 22 is another subprocessor controlled peripheral circuit coupled with the central control processor 14 and the status and control circuit 24 which provides an interface between line printers, data links and cathode ray tube terminals (not shown) of the system 10 and the central control circuit unit 14.

The remote maintenance device 26 is a window based workstation with a terminal which provides an intelligent interface between the user of the device and the multiport switch 12. The user at the remote device enters various commands to perform diagnostic and maintenance functions on the switch 12 when the telecommunication system is in the off-line operating state. The remote device 26 is connected to an external modem 28 which converts digital signals received from the remote device to analog signals transmitted through the external telephonic switching network 20 and vice-versa. The signals from the remote device 26 via the external modem 28 and the external telephonic switching network 20 are transmitted to a single connection modem 30 of the telecommunication system 10. The demodulator of the single connection modem 30 converts the analog signal received through the external telephonic network 20 into a digital signal which is transmitted using a standard RS-232 interface to a remote port 32 at the status and control circuit card 24. The single connection modem 30 further converts a digital signal received from the STC card 24 to an analog signal for transmission through the external telephonic switching network 20 and eventually to the remote device 26. The single connection modem 30 interfaces with a remote port 32 of the STC card 24 through a serial 31 and serially communicates using a standard RS-232 protocol.

In the preferred embodiment, the remote device 26 accesses information from the multiport switch 12 regardless of the operating state (i.e on-line state or off-line state) of the system 10. If the telecommunication system 10 is in an off-line state the remote device 26 communicates to the central control processor or central control unit 14 only through the status and control card 24. The STC circuit 24 provides only relatively limited user interface capability for performing diagnostic tests and maintenance functions on the multiport switch 12 of the system 10. Preferably, the user interface obtained while the system 10 is off-line is limited to the status and control card 24 restarting of the switch 12 via the central control unit 14 to return the system to the on-line operating status. If the system 10 is in the on-line operating state a relatively full featured user interface is available to the user at the remote device 26 via the peripheral data interface (PDI) circuit card 22. An existing PDI port 34 is coupled via a serial cable 36 to an existing STC port 38 on the STC card 24. Data transmissions between the existing PDI port 34 of the PDI card 22 and the existing STC port 38 coupled across the serial cable 36 preferably follow a standard RS-232 communications protocol. In response to the user of the remote maintenance device 26 dialing into the switch 12, or the switch automatically dialing out, the status and control card 24 adapts to the proper user interface (i.e. limited user capabilities, or full featured over capabilities) based upon the operating state of the multiport switch.

If the telecommunication system 10 is in the off-line operating mode then the remote communications control task software running on the STC card 24 receives data at the remote port 32 of the STC and responds by providing a minimal user interface and capabilities at the remote device 26. In the off-line state, the STC card 24 bypasses the PDI card and directly communicates with the central control processor 14. Thus, a serial connection is established between the serial cable 31 connected to the STC 24 and the central control processor 14 when the system 10 is in an off-line state.

If the telecommunication system 10 is in the on-line operating state, the remote communications control task is removed from the data flow by executing a PDI port interrupt handler and allowing the remote port 32 interrupt handler to transfer the incoming data from the remote device 26 directly to the STC port 38 connected to the PDI port 34 of the PDI 22. The remote port handler is an interrupt routine which runs on the STC card 24 and functions to transfer data from the remote port 32 of the STC. The PDI port interrupt handler is an interrupt routine which runs on the STC card 24 and services the STC port 38 connected to the PDI port 34 of the PDI card 22 by the serial cable 36. The PDI port interrupt handler transfers outgoing data to the remote device 26 directly to the remote port 32. This pass-through mode occurring when the telecommunication system 10 is on-line, allows bidirectional communication between the remote device 26 and the full featured interface to the multiport switch of the existing STC port 38 coupled to the PDI circuit 22. In response to the STC card 24 determining the operating state of the telecommunication system 10, the STC selectively obtains a relatively full featured user interface through the serial cable 31 connected to the single connection modem 30 when it determines that the system 10 is on-line. The STC 24 obtains a relatively limited user interface through the serial cable 31 connected to the single connection modem when the STC determines that the telecommunication system 10 is off-line.

A keep-alive message or on-line signal is periodically sent from the central control processor 14 of the multiport switch 12 to the STC circuit 24 every fifteen seconds to inform the STC circuit of the operating state of the telecommunication system 10. The STC circuit 24 monitors the operating state of the system 10 through the receipt of the on-line signal sent from the central control processor 14. Failure to receive a keep-alive message at the STC circuit 24 after fifteen seconds indicates that the telecommunication system 10 is in the off-line operating state. The status and control card 24 determines the operating state of the system 10 based on the receipt of the keep alive messages from the central control unit 14 of the switch 12. In response to the system 10 making the transition from the on-line operating state to the off-line state, while a user at the remote device 26 is connected to the system, the pass through mode of the STC card 24 is discontinued by disabling the PDI port interrupt handler and allowing the STC card to intercept and to respond to the incoming data received from the remote device 26. If the telecommunication system 10 transitions from the off-line state to the on-line state, the user at the remote device 26 enters an appropriate command to re-establish the pass through mode at the STC card 26, thereby enabling the user at the remote device to have full featured capabilities. The remote communications control task software running on the STC circuit 24 allows the remote device 26 to access information through a serial cable 31 connected with the standard single connection modem 30. The pass through feature of the STC card 24 eliminates the costly disadvantages as seen in the known systems of needing a sophisticated software controlled multiplexing modem in order for a remote device to gain access to a plurality of peripheral subprocessor controlled circuit cards in a telecommunication system having a distributed architecture. Preferably, the standard single connection modem 30 utilized in the telecommunication system 10 of the present invention is a Universal Data System V.3224/V.3225 type model.

The central control processor unit 14 is the primary processing element of the multiplexing multiport switch 12. The central control processor 14 receives information from the peripheral subprocessor controlled circuits 22 and 24 and affects the central control of the system 10. The central control processor unit 14 contains a 68030 microprocessor and 6881 arithmetic co-processor operating at a thirty-three MHz clock rate. Additionally, the central control processor is equipped with five hundred twelve kbytes of SRAM and two hundred fifty-six kbytes of EPROM. The central control unit 14 controls maintenance as an essential element in the telecommunication system 10 switching function during fault conditions. Generally, while the selective remote interface assembly 11 of the present invention can be implemented in numerous types and sizes of telecommunication systems employing a computer controlled multiport switch, it is preferably employed in a telecommunication system of the type shown in patent application U.S. Ser. No. 07/770, 197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No 5,127,004 of Lenihan et al. entitled "Tone and Announcement Message Code Generator for a Telephonic Switching System and Method", issued Jun. 30, 1992.

The Peripheral Data Interface (PDI) Card 22 has a 68000 microprocessor operating at a ten MHz clock rate. The clock of the PDI 22 is equipped with two Mbytes of on-board DRAM and sixty-four Kbytes of EPROM. The PDI 22 supports eight serial data ports, each of which may be configured for RS232C, RS423, RS422 or RS485 operation. X.25 synchronous ports up to one MHz (external clocks) as well as asynchronous ports up to 19.2 Kbaud (internal clocks) are supported. For further details of the operation and functionality of the peripheral data interface circuit card 22 reference can be made to U.S. patent application Ser. No. 07/976,131 of Kovarik entitled "Automatic Call Distributor With a Programmable Data Window Display System and Method" filed Nov. 12, 1992.

The Status and Control (STC) card 24 provides functions for remote interfacing, a local interfacing, alarm signal gathering/interpretation/control, and interfacing with central control unit 14 as part of the system control and fault recovery structure. The STC 24 contains a 68000 microprocessor operating at a ten MHz clock rate. The STC 24 is equipped with two Mbytes on-board DRAM 48, one hundred twenty-eight Kbytes of EPROM 52 and eight Kbytes of battery-backed SRAM 54.

Figure 2:
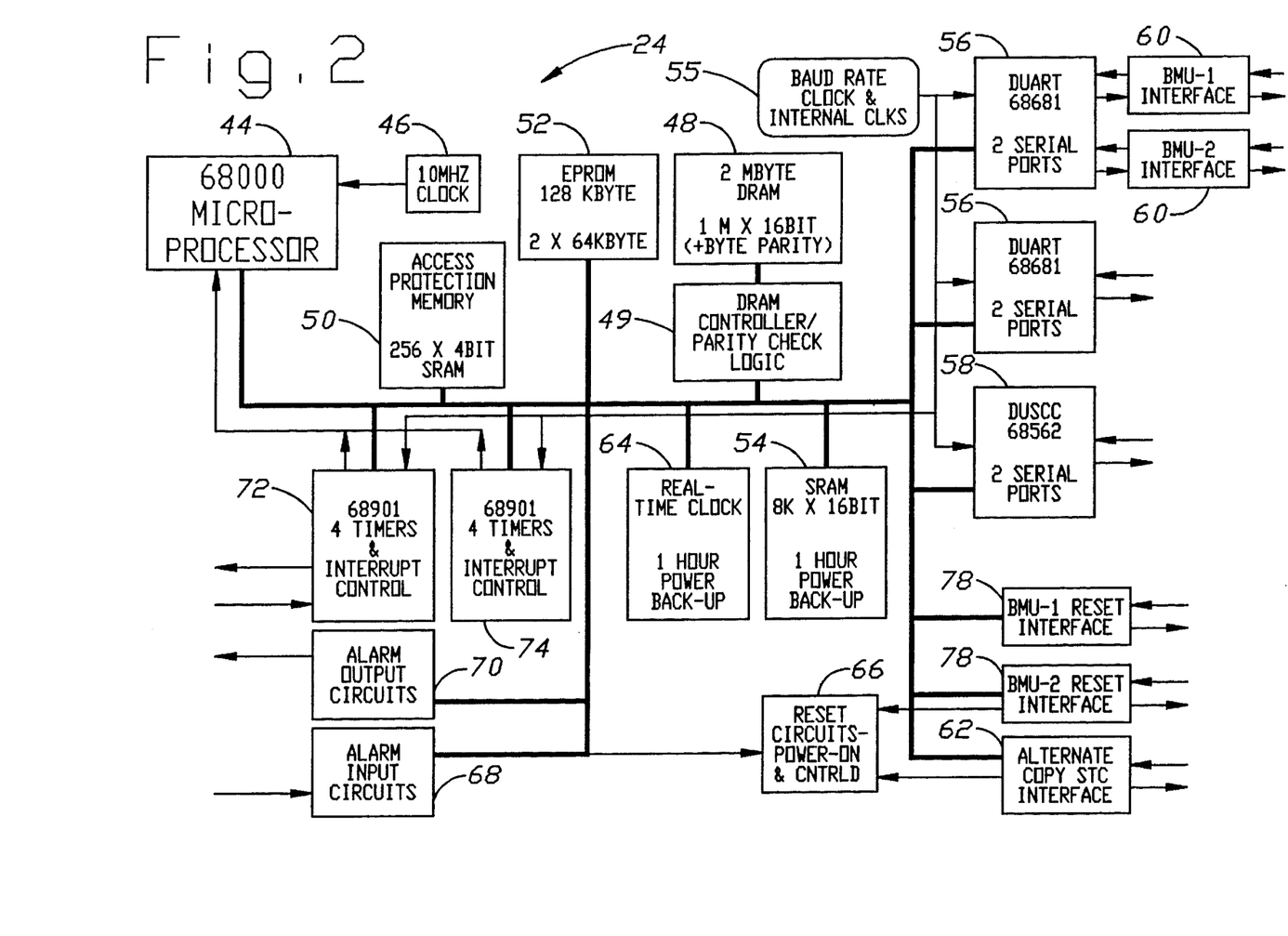
FIG. 2 is a functional block diagram of the status and control circuit card of FIG. 1.

Referring to FIG. 2, the STC card 24 is shown with a 68000 microprocessor 44 operating from a ten MHz clock 46 providing the intelligence for the STC. A two Megabyte Dynamic Random Access Memory (DRAM) 48 device array (one M×sixteen bits+two parity bits) provides memory space for down-loaded code, data storage and scratch space. The DRAM 48 read/write cycle time is four hundred nanoseconds. DRAM 48 integrity is checked by parity bits over byte boundaries with a DRAM controller 49 with parity check logic. Memory access protection of the DRAM 48 is provided by a two hundred fifty-six×four bit static random access memory (SRAM) 50 and allows write, fetch and supervisor protection capability over eight Kbyte blocks of the DRAM for software diagnostic purposes. One hundred twenty-eight kbytes of erasable programmable read only memory (EPROM) 52 are used for very basic diagnostic and boot loader functions since the majority of the functional code for the operation of the status and control circuit 24 is down-loaded to the DRAM 48 upon initialization of the status and control circuit. The read cycle time of the EPROM 52 is five hundred nanoseconds. The software protocols for the remote communications control software operation are resident in the EPROM 52. An eight K×sixteen bit static RAM 54 having one hours of power back-up is provided as nonvolatile storage space for system parameters and diagnostic information. Timing of the various devices of the status and control circuit card 24 is provided by the baud rate and internal clocks 55 in the system.

Six serial ports are supported by the STC card 24 by two 68681 DUART (Dual Universal Asynchronous Receiver/Transmitter) devices 56 and one 68562 DUSCC (Dual Universal Serial Communications Controller) device 58. The 68681 DUART 56 provides asynchronous serial ports with TTL signal-level line drivers/receivers for interface links to the central control processor also called the bus maintenance unit (BMU) 14, FIG. 1 and to an alternate copy STC interface 62. An STC to STC interface link and two STC to BMU links are part of the redundancy and fault recovery mechanism of the architecture in fully redundant systems. The DUARTs 56 provide two central control unit links or BMU links 60 allowing access into the central control processors 14, FIG. 1, for the remote external maintenance device 26, FIG. 1.

The 68562 DUART device 58 supports two RS232C ports with one to a local terminal and the other to a standard single connection modem 30. These devices support a variety of protocols, both asynchronous and synchronous, including X.25, BX.25 and other SDLC/HDLC type formats. A port is provided for linking over the standard single connection modem 30, FIG. 1, to the remote device 26.

Central control processor interfaces 60 are provided to the central control processor unit or BMU 14 as part of the fault recovery philosophy of the telecommunication system 10 distributed processor architecture. The central control processor interface 60 consists of a standard serial interface with several control leads.

The STC card 24 is the telecommunication system 10 alarm gatherer/interpreter/controller. The alarm input circuits 68 and alarm output circuits 70 of the STC 24 gather alarms from the remote device 26 and reports them through software interaction through relay contact outputs. The STC 24 has provision for up to seventy-six separate loop closure inputs for alarm detection.

Two 68901 multifunction peripherals 72 and 74 each contain four eight bit timers, an interrupt prioritization/control function and a serial port. One 68901 multifunction peripheral 72 is fed by a 3.6864 MHz clock, from the internal clock circuit 55 and is programmed with one its timers acting as baud rate generator for its serial port. The other 68901 multifunction peripheral 74 is fed by a 2.5 MHz clock from the internal clock circuit 55. Preferably, one of the timers of the multifunction peripheral 74 is programmed by software to provide a ten millisecond clock source for use as a relative real-time reference and for use as a ten millisecond interrupt source for the microprocessor 44.

A real-time clock device 64, FIG. 2, implemented on the STC 24 is used for time-tracking system outages and other short term timing functions. The clock 64 is driven by a signal derived from an onboard crystal oscillator. The real time clock device 64 has up to four hours of power backup protection. Sixty-four bytes of memory are also provided within the clock 64 for storage of various system parameters.

A power-on reset circuit controller 66 is provided to ensure a clean start-up condition. The reset logic of the power-on reset circuit 66 responds to a signal from the central control circuit 14, FIG. 1, over a reset maintenance interface 78 to the STC 24. The on-board microprocessor 44 also initiates a software directed board level reset to attempt correction of a nonresponsive condition.

While the advantages are preferably obtained with the telecommunication system 10 described above with reference to FIGS. 1 and 2, the method of the invention can be practiced with any other telecommunication systems with a distributed processor architecture having a central control processor and a plurality of subprocessor controlled peripheral circuits through which the central control processor receives information and affects a central control of the system. In any event, the preferred method of practicing the invention comprises the steps of (1) determining the operating state of the telecommunication system and (2) selectively obtaining a relatively full featured user interface through a single connection modem connecting means, when it is determined that the system is in an on-line state and selectively obtain a relatively limited user interface through the single connection modem connecting means, when it is determined that the telecommunication system is in an off-line state.

Figure 3A:
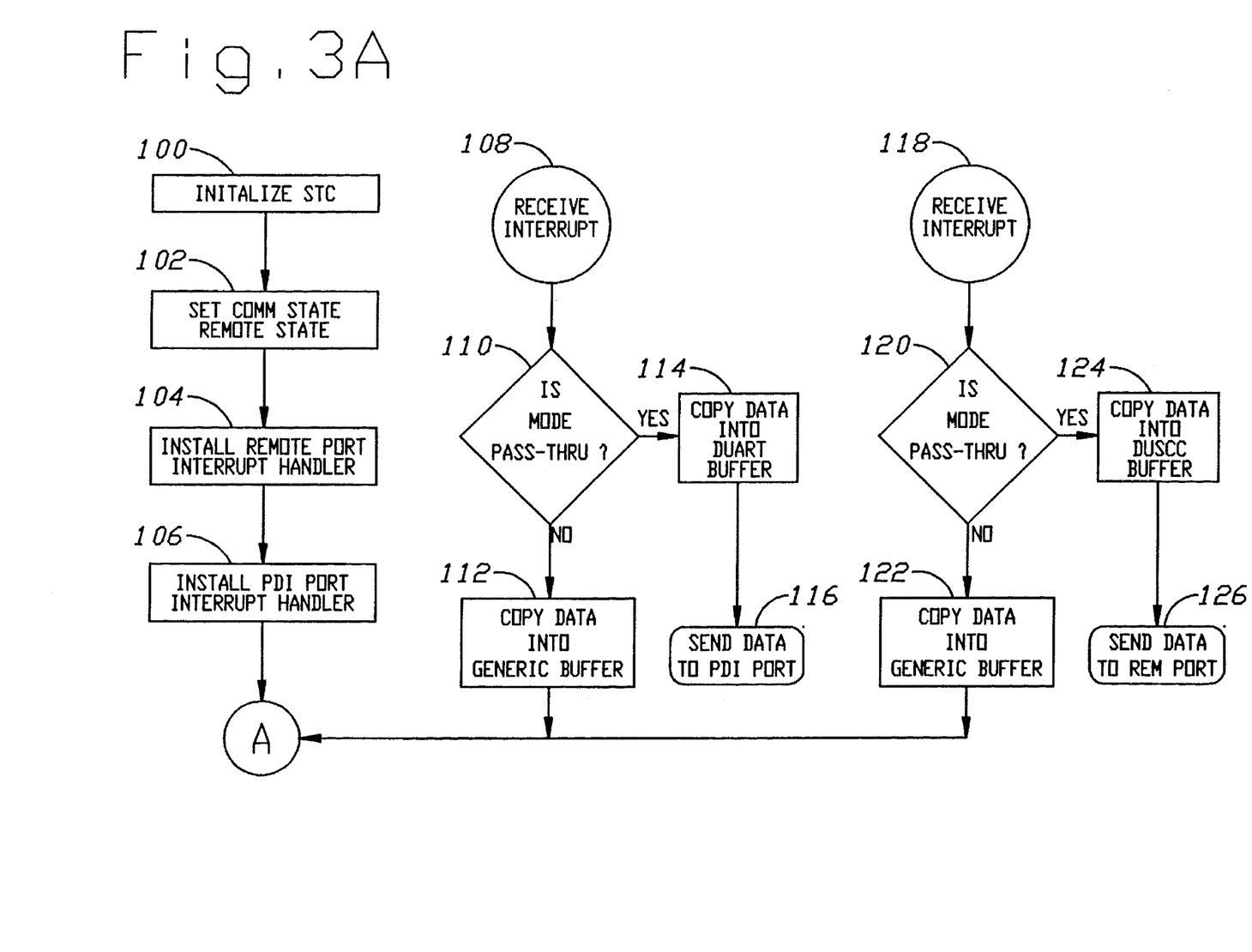
FIGS. 3A and 3B form a composite flow chart of the preferred remote communications control software computer program stored in the status and control circuit card of FIGS. 1 and 2 and as reproduced in the printed computer program listing of Appendix A attached to the back of this application.
Figure 3B:
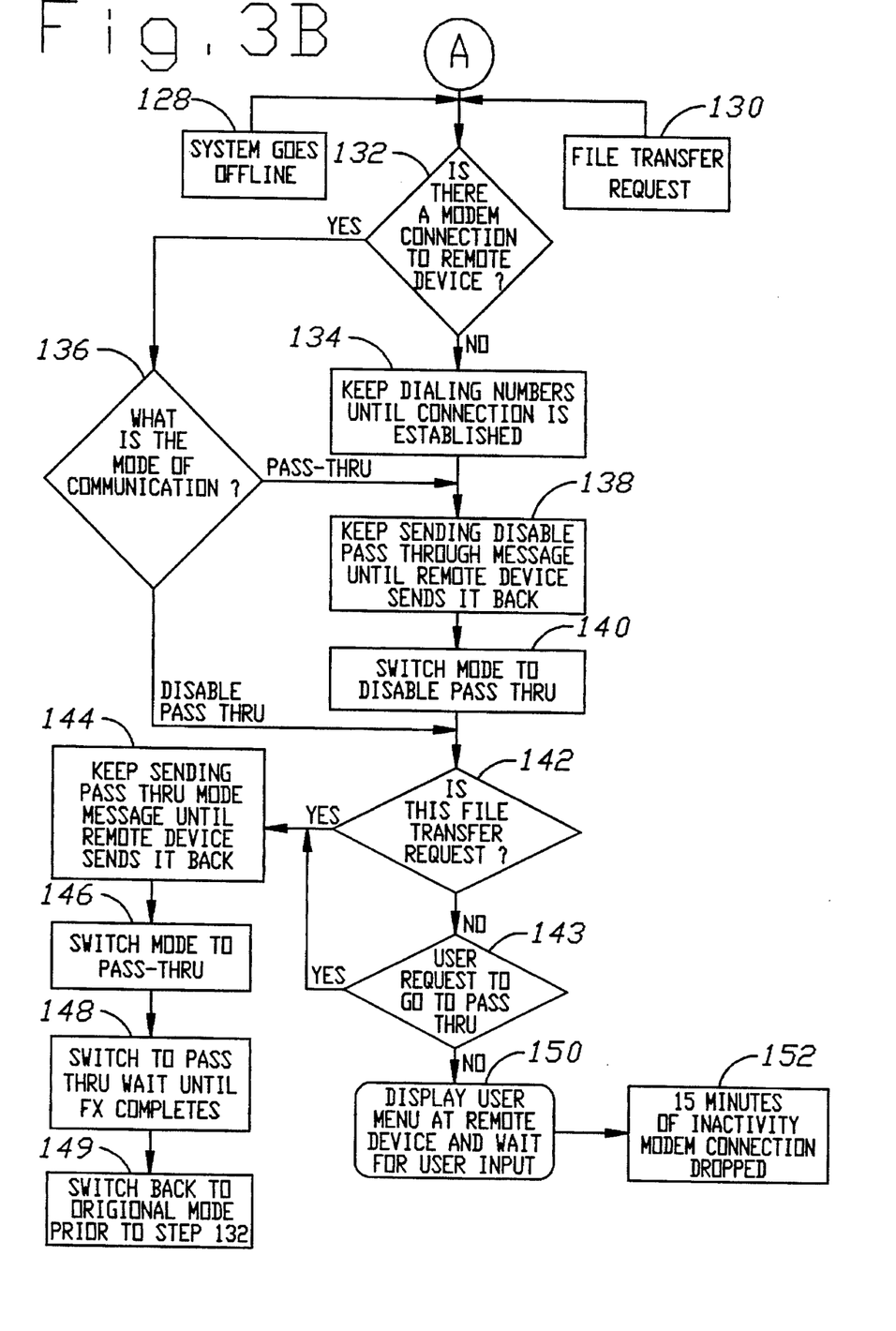

Referring now to FIGS. 3A and 3B, status and control circuit card 24 contains the remote communications control task computer program to achieve the various functions of the invention described above. The listing of the program is attached in Appendix A. FIGS. 3A and 3B illustrate a flow chart for the preferred computer program in the Status and Control circuit card, FIG. 2, and as reproduced in the printed computer program listing of Appendix A attached to the back of this application.

Referring to FIG. 3A, steps 100–106 illustrate the initial power-up of the STC circuit card 24. In step 100 the STC card 24, FIG. 1, is initialized by applying external power to the circuit card. In step 102, the communication state is set to the remote state or the disable pass through mode. In the remote state, characters are sent one at a time from the remote device 26, FIG. 1, to the STC circuit 24. In the remote state there is no protocol for the sending of the data entered at the remote device 26 appearing on the terminal screen of the remote device. In step 104 the interrupt handler for the remote port 32, FIG. 1, is installed. The remote port interrupt handler preforms the functional processing of the information received from an interrupt on the remote port 32 of the STC card 24. In step 106, FIG. 3A, the PDI port interrupt handler is installed to process the information received at the STC port 38 connected to the PDI card 22, FIG. 1. Once the PDI port interrupt handler is installed, the remote connection control proceeds to step 132, FIG. 3B.

Steps 108–116, FIG. 3A, illustrate the software processing for the reading of a remote port 32, FIG. 1, interrupt. In step 108, FIG. 3A, an interrupt is received from the remote device 26, FIG. 1, at the remote port 32 of the STC circuit 24. In step 110, FIG. 3A, the microprocessor 44, FIG. 2, of the STC circuit 24 determines if it, FIG. 1, is in the pass-through mode thereby indicating that the system 10 is on-line. If the STC circuit 24 is not in the pass-through mode, then in step 112, FIG. 3A, the data sent from the remote device 26 is copied into a generic buffer at the DPRAM 48, FIG. 2 of the STC card 24. Once the received data is copied into a generic buffer of the DRAM 48, the remote port interrupt routine proceeds to step 132. If the switch 12, FIG. 1, is in the pass-through mode, then in step 114, FIG. 3A, the data received at the remote port 32, FIG. 1, is copied into a memory buffer at the DUART 56, FIG. 2, of the STC circuit 24. In step 116, FIG. 3A, the data is sent to the existing STC port 38, FIG. 1, connected to the PDI circuit 22 across the serial cable 36.

Steps 118–126 illustrate the PDI port interrupt routine of the remote communications control task software. In step 118, FIG. 3A, the STC circuit 24, FIG. 1, receives an interrupt from the PDI 22 at the existing STC port 38. In step 120 the microprocessor 40, FIG. 2, of the STC card 24, FIG. 1, determines if it is in the pass-through mode by reading the communication state of the card. If the STC card 24 is not in the pass-through mode, then the data received at the existing STC port 38 is copied into the generic buffer of the DRAM 48, FIG. 2, of the STC circuit 24. If the STC 24, FIG. 1, is in the pass-through mode, then in step 124, FIG. 3A, the data received at the existing STC port 38, FIG. 1, is copied into the DUSCC buffer 58 of the STC card circuit 24. In step 126, FIG. 3A, the data is sent to the remote port 32 of the status and control circuit 24.

Referring to FIG. 3B, in step 128, the remote communications control task is initiated in response to the telecommunication system 10, FIG. 1, going off-line. Furthermore, the remote communications control task is also initiated in response to the central control circuit 14, FIG. 1, of the switch 12 requesting a file transfer in step 130. In the telecommunication system 10 of the preferred embodiment, a file transfer request occurs only when the STC 24 is in the pass-through mode. The central control circuit 16 transfers information to the user at the remote device 26 upon the occurrence of predetermined conditions. Preferably, the information in a transferred file informs the user at the remote device 26 of technical problems within the telecommunication system 10 in order for the user to perform maintenance operations on the system from a remote location. The conditions discussed in steps 128 and 130, FIG. 3B, operate independently of the operating state of the telecommunication system 10, FIG. 1.

In step 132, FIG. 3B, the microprocessor 44, FIG. 2, of the STC circuit card 24 determines if there is a modem 30, FIG. 1, connection to the remote device 26. If there is no modem connection, then the STC 24 continues to dial out until a connection is established at the modem 30. If there is a connection between the modem and the remote device 26, then in step 136, FIG. 3B, the microprocessor 44, FIG. 2, of the STC circuit 24 determines the mode of communication for the STC. If the STC 24 is in the pass-through mode, then in step 138, FIG. 3B, the STC circuit card 24, FIG. 1, repeatedly sends a disable pass through mode message to the remote device 26 until the remote device returns the message back to the STC circuit card 24. The return of the disable pass through mode message indicates that the remote device 26 10 is in the pass-through mode. In step 140, FIG. 3B, the STC circuit card 24, FIG. 1, changes to the disable pass through mode.

If the STC circuit 24 determines that the mode of communication is in the disable pass-through mode in step 136, FIG. 3B, or if the STC circuit switches to the disable pass through mode in step 140, then the remote communications control task proceeds to step 142. In step 142, the STC circuit 24 determines if a received request is for a file transfer. If the request is a file transfer request, then in step 144, FIG. 3B, the STC circuit 24, FIG. 1, repeatedly sends a pass through mode message until the remote device 26 returns the pass-through message to the STC. In step 146, FIG. 3B, the STC circuit 24, FIG. 1, switches to the pass-through mode thereby enabling the remote device 26 to have a full featured interface to the multiport switch 12 through the PDI circuit 22. In step 148, FIG. 3B, the pass-through mode continues at the STC circuit 24, FIG. 1, until the central control unit 14 of the multiport switch 12 completes the file transfer. In step 149, FIG. 3B, the STC card switches back to its original mode prior to step 132.

If, in step 142, the STC circuit, FIG. 1, determines that the received request is not a file transfer request, then in step 143, FIG. 3B, the STC circuit determines if the received request is a request by the user at the remote device 26 to go to the pass-through mode. If the received request is a request to go to the pass-through mode, then the STC 24 goes to step 144, FIG. 3B, to repeatedly send a pass-through mode message to the remote device 26. The STC circuit, FIG. 1, then proceeds to execute steps 144–149. If the received request is not a request to go to the pass through mode, then in step 150, FIG. 3B, the STC circuit 24, FIG. 1, displays a user menu at the remote device 26 and waits for a user input at the remote device. In step 152 the modem 30 connection is dropped after fifteen minutes of inactivity at the remote device.

While a detailed description of the preferred embodiment of the invention has been given, it should be appreciated that many variations can be made thereto without departing from the scope of the invention as set forth in the appended claims.

We claim:

1. In a telecommunication system with a distributed processor architecture having a central control processor and a plurality of subprocessor controlled peripheral circuits through which the central control processor receives information and affects a central control of the system, the improvement being a selective remote interface assembly, comprising:

means for connecting with a single connection modem;
   means for determining the operating state of the telecommunication system; and
   means responsive to the operating state determining means for selectively obtaining a relatively full featured user interface through the single connection modem connecting means when it is determined that the telecommunication system is in an on-line state and for obtaining a relatively limited user interface through the single connection modem connecting means when it is determined that the telecommunication system is in an off-line state.

2. The telecommunication system of claim 1 in which the interface obtaining means includes a subprocessor controlled peripheral control circuit coupled with the central control processor and with the single connection modem connecting means for selectively establishing an interface therebetween.

3. The telecommunication system of claim 2 in which the interface obtaining means includes a peripheral data interface circuit, and
means for coupling the single connection modem connecting means to the central control processor through the peripheral data interface circuit when it is determined that the telecommunication system is in the on-line state.

4. The telecommunication system of claim 3 in which the coupling means includes means for establishing a serial connection between the single connection modem connecting means and the peripheral data interface circuit.

5. The telecommunication system of claim 3 including means for bypassing the peripheral data interface circuit to establish a serial connection between the single connection modem connecting means and the central control processor when it is determined that the telecommunication system is in the off-line state.

6. The telecommunication system of claim 2 in which the interface obtaining means includes means for establishing a direct connection between the single connection modem connecting means and the central control processor when it is determined that the telecommunication system is in the off-line state.

7. The telecommunication system of claim 2 in which the interface obtaining means includes means for interfacing the single connection modem connecting means through another subprocessor controlled peripheral circuit for communication with the central control processor when the system is in the on-line state.

8. The telecommunication system of claim 2 in which the interface obtaining means includes means at the control circuit for disabling the interface obtaining means.

9. The telecommunication system of claim 1 in which the interface obtaining means includes means for establishing direct communication with the central control processor when the telecommunication system is in the off-line state to obtain the relatively limited user interface with the single connection modem connecting means.

10. The telecommunication system of claim 1 in which the operating state determining means includes means for monitoring an on-line signal generated by the central control processor.

11. The telecommunication system of claim 10 in which the operating state determining means includes means for determining that the system is off-line when the on-line signal is not being generated by the central control processor.

12. The telecommunication system of claim 11 in which said on-line signal is periodic.

13. In a telecommunication system with a distributed processor architecture having a central control processor and a plurality of subprocessor controlled peripheral circuits through which the central control processor receives information and affects a central control of the system, the improvement being a method for selectively establishing a remote interface with the central control processor, comprising the steps of:

determining the operating state of the telecommunication system; and
   selectively obtaining a relatively full featured user interface through a single connection modem connecting means when it is determined that the telecommunication system is in an on-line state and selectively obtaining a relatively limited user interface through the single connection modem connecting means when it is determined that the telecommunication system is in an off-line state.

14. The method of claim 13 in which the step of selectively obtaining includes the step of establishing a connection between a subprocessor controlled peripheral control circuit coupled with the central control processor and with the single connection modem connecting means for selectively establishing an interface therebetween.

15. The method of claim 14 in which the step of selectively obtaining includes the step of coupling a single connection modem connecting means with the central control processor through a peripheral data interface circuit when it is determined that the telecommunication system is in the on-line state to provide the relatively full featured user interface.

16. The method of claim 15 in which the step of coupling includes the step of establishing a serial connection between the single connection modem connecting means and a peripheral data interface circuit.

17. The method of claim 15 in which the step of establishing includes the step of bypassing the peripheral data interface circuit to establish a serial connection between the single connection modem connecting means and the central control processor for a relatively limited user interface when it is determined that the telecommunication system is in the off-line state.

18. The method of claim 14 in which the step of selectively obtaining includes the step of establishing a direct connection between a single connection modem connecting means and the central control processor for a relatively limited user interface when it is determined that the telecommunication system is in the off-line state.

19. The method of claim 14 in which the step of selectively obtaining includes the step of interfacing a single connection modem connecting means through another subprocessor controlled peripheral circuit for a relatively full featured user interface with the central control processor when the system is in the on-line state.

20. The method of claim 14 in which the step of selectively obtaining includes the step of selectively disabling an interface obtaining circuit from establishing one of said interfaces.

21. The method of claim 13 in which the step of selectively obtaining includes the step of establishing direct communication with the central control processor when the telecommunication system is in the off-line state to obtain the relatively limited user interface with the single connection modem connecting means.

22. The method of claim 13 in which the step of determining the operating state includes the step of monitoring an on-line signal generated by the central control processor.

23. The method of claim 22 in which the step of determining the operating state includes the step of determining that the system is off-line when the on-line signal is not being generated by the central control processor.

* * * * *